United States Patent
Raghunathan et al.

(10) Patent No.: US 11,510,277 B2
(45) Date of Patent: *Nov. 22, 2022

(54) WIRELESS DISCONTINUOUS RECEPTION (DRX) BASED ON USER EQUIPMENT (UE) SUBSCRIBER DATA

(71) Applicant: T-MOBILE INNOVATIONS LLC, Overland Park, KS (US)

(72) Inventors: Sathyanarayanan Raghunathan, Herndon, VA (US); Muthukumaraswamy Sekar, Brambleton, VA (US); Maheswaran Vijayakumar, Herndon, VA (US); Suresh Majjara, Herndon, VA (US)

(73) Assignee: Sprint Communications Company LP, Overland Park, KS (US)

( * ) Notice: Subject to any disclaimer, the term of this patent is extended or adjusted under 35 U.S.C. 154(b) by 107 days.

This patent is subject to a terminal disclaimer.

(21) Appl. No.: 17/068,353

(22) Filed: Oct. 12, 2020

(65) Prior Publication Data

US 2021/0045182 A1 Feb. 11, 2021

Related U.S. Application Data

(63) Continuation of application No. 16/356,229, filed on Mar. 18, 2019, now Pat. No. 10,841,971.

(51) Int. Cl.
| | |
|---|---|
| *H04W 76/28* | (2018.01) |
| *H04W 8/20* | (2009.01) |
| *H04W 76/27* | (2018.01) |
| *H04W 84/04* | (2009.01) |

(52) U.S. Cl.
CPC ............ *H04W 76/28* (2018.02); *H04W 8/20* (2013.01); *H04W 76/27* (2018.02); *H04W 84/042* (2013.01)

(58) Field of Classification Search
CPC ....... H04W 76/27; H04W 76/28; H04W 8/20; H04W 84/042
See application file for complete search history.

(56) References Cited

U.S. PATENT DOCUMENTS

| | | |
|---|---|---|
| 7,760,676 B2 | 7/2010 | Demirhan et al. |
| 7,957,360 B2 | 6/2011 | Suzuki et al. |
| 8,169,957 B2 | 5/2012 | Damnjanovic |
| 8,238,260 B2 | 8/2012 | Terry et al. |
| 8,265,682 B2 | 9/2012 | Bertrand et al. |
| 8,755,313 B2 | 6/2014 | Damnjanovic et al. |
| 9,014,032 B2 | 4/2015 | Terry et al. |
| 9,307,491 B2 | 4/2016 | Ekici et al. |
| 9,749,951 B2 | 8/2017 | Terry et al. |
| 10,212,755 B1 | 2/2019 | Pawar et al. |

(Continued)

*Primary Examiner* — Phuc H Tran (57) ABSTRACT

In radio circuitry, transceiver circuitry wirelessly exchanges data signals with wireless User Equipment (UEs). Radio Resource Control (RRC) circuitry receives individual subscriber data for individual ones of the UEs. The RRC circuitry transfers the individual subscriber data to Media Access Control (MAC) circuitry. The MAC circuitry selects individual Discontinuous Reception (DRX) duty cycles for the individual ones of the UEs based their individual subscriber data. The transceiver circuitry wirelessly exchanges subsequent data signals with the UEs using the selected individual DRX duty cycles for the individual ones of the UEs.

18 Claims, 6 Drawing Sheets

(56) References Cited

U.S. PATENT DOCUMENTS

| | | | |
|---|---|---|---|
| 10,433,271 B2 | 10/2019 | Wang et al. | |
| 10,477,614 B2 | 11/2019 | Feuersaenger et al. | |
| 2007/0287468 A1* | 12/2007 | Jeong ................ | H04W 52/0216 455/452.2 |
| 2007/0291728 A1* | 12/2007 | Dalsgaard ......... | H04W 52/0216 370/347 |
| 2010/0130237 A1 | 5/2010 | Kitazoe et al. | |
| 2020/0037396 A1 | 1/2020 | Islam et al. | |

\* cited by examiner

WIRELESS DISCONTINUOUS RECEPTION (DRX) BASED ON USER EQUIPMENT (UE) SUBSCRIBER DATA

RELATED CASES

This United States patent application is a continuation of U.S. patent application Ser. No. 16/356,229 that was filed on Mar. 18, 2019 and is entitled "WIRELESS DISCONTINUOUS RECEPTION (DRX) BASED ON USER EQUIPMENT (UE) SUBSCRIBER DATA." U.S. patent application Ser. No. 16/356,229 is hereby incorporated by reference into this United States patent application.

TECHNICAL BACKGROUND

Wireless user devices exchange wireless signals with wireless communication networks for data services like voice-calling, internet-access, and media streaming. The wireless communication networks have wireless access points that exchange the wireless signals with the wireless user devices. A wireless access point has several antennas, modulators, and processors. The wireless user devices also have antennas, modulators, and processors. The processors execute network applications to control the transmission and reception of the wireless signals. The network applications comprise Physical Layer (PHY), Media Access Control (MAC), Radio Link Control (RLC), Packet Data Convergence Protocol (PDCP), Radio Resource Control (RRC), and Service Data Application Protocol (SDAP).

In particular, the MACs in the wireless user devices and the wireless access points interact to schedule wireless transmissions. Discontinuous Reception (DRX) is a form of scheduling that conserves battery power in the wireless user devices. DRX controls when a wireless user device powers up its radio circuitry to receive wireless signals or transmit network signaling and when the wireless user device powers down its radio circuitry to save battery power. The DRX on/off schedule is called a DRX duty cycle.

The wireless user devices have corresponding subscriber data like home/roam status, virtual network, mobile network, and wireless network slice. In particular, the RRCs in the wireless user devices and the wireless access points interact to identify the subscriber data. Unfortunately, the wireless data networks do not efficiently and effectively use the subscriber data to control DRX. Moreover, DRX duty cycles are not be customized for specific types of wireless user devices.

TECHNICAL OVERVIEW

In radio circuitry, transceiver circuitry wirelessly exchanges data signals with wireless User Equipment (UEs). Radio Resource Control (RRC) circuitry receives individual subscriber data for individual ones of the UEs. The RRC circuitry transfers the individual subscriber data to Media Access Control (MAC) circuitry. The MAC circuitry selects individual Discontinuous Reception (DRX) duty cycles for the individual ones of the UEs based their individual subscriber data. The transceiver circuitry wirelessly exchanges subsequent data signals with the UEs using the selected individual DRX duty cycles for the individual ones of the UEs.

DETAILED DESCRIPTION

Figure 1:
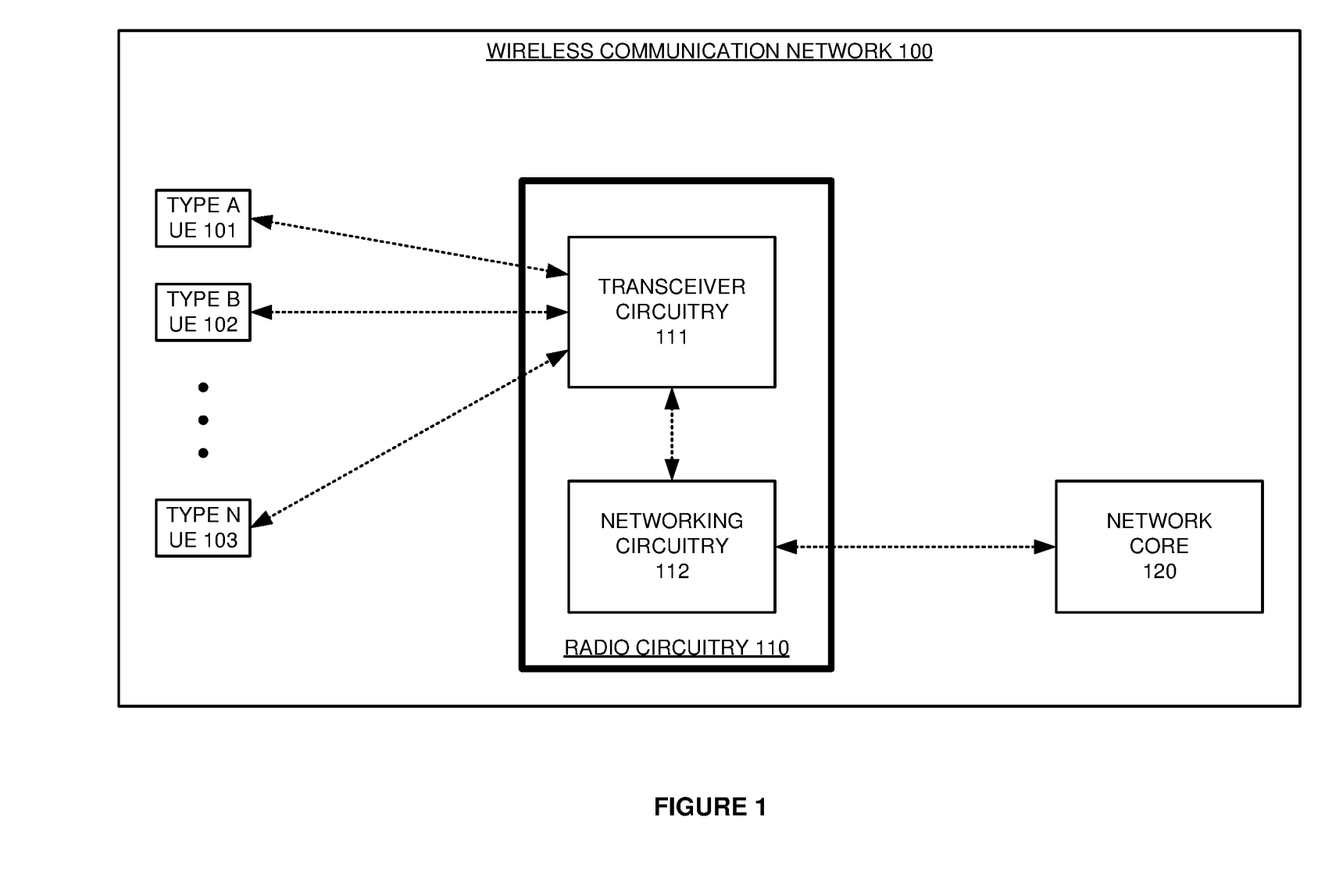
FIG. 1 illustrates a wireless communication network that controls Discontinuous Reception (DRX) based on User Equipment (UE) subscriber data.

FIG. 1 illustrates wireless communication network 100 that controls Discontinuous Reception (DRX) based on User Equipment (UE) subscriber data. Wireless communication network 100 comprises UEs 101-103, radio circuitry 110, and network core 120. UEs 101-103 have respective UE types A-N where the letters A-N represent subscriber data like virtual network identifiers, Quality-of-Service (QoS) levels, home/roam status, wireless network slice, UE access class, and/or the like. For example, the UE types A-N may indicate different virtual networks for UEs 101-103. Note that the number of UEs depicted on FIG. 1 has been restricted for clarity, and radio circuitry 110 serves many more UEs that are like UEs 101-103.

UEs 101-103 might be phones, computers, robots, vehicles, sensors, and the like. UEs 101-103 comprise radio circuitry and control circuitry. The radio circuitry comprises antennas, modulators, amplifiers, filters, digital/analog interfaces, processing circuitry, memory circuitry, and bus circuitry. The control circuitry comprises processing circuitry, memory circuitry, and bus circuitry. Software is stored in the memory circuitry and includes operating systems, network applications, and user applications. The network applications comprise Physical Layer (PHY), Media Access Control (MAC), Radio Link Control (RLC), Packet Data Convergence Protocol (PDCP), Radio Resource Control (RRC), and Service Data Application Protocol (SDAP), or some other networking protocol stack. The processing circuitry executes the operating systems, user applications, and network applications to exchange wireless data signals with radio circuitry 110.

Radio circuitry 110 comprises transceiver circuitry 111 and networking circuitry 112. Transceiver circuitry 111 receives wireless signals from UEs 101-103 and transmits wireless signals to UEs 101-103. The wireless signals use Fifth Generation New Radio (5GNR), Long Term Evolution (LTE), Institute of Electrical and Electronic Engineers (IEEE) 802.11 (WIFI), and/or some other wireless protocol. Transceiver circuitry 111 is coupled to networking circuitry 112 over one or more data links. Networking circuitry 112 is coupled to other network elements over one or more data links. The data links use IEEE 802.3 (Ethernet), Internet Protocol (IP), Intra-Processor Communications (IPC), bus data protocols, Time Division Multiplex (TDM), Data Over Cable System Interface Specification (DOCSIS), Wave Division Multiplexing (WDM), WIFI, 5GNR, LTE and/or the like.

Radio circuitry 110 comprises hardware like Digital Signal Processors (DSPs), Central Processing Units (CPUs), Graphical Processing Units (GPUs), Field Programmable Gate Arrays (FPGAs), Random Access Memory (RAM), flash memory, bus structures, network transceivers, and/or the like. Transceiver circuitry 111 further comprises antennas, modulators, amplifiers, filters, digital/analog interfaces, and the like. Software is stored in the memory circuitry and includes operating systems and network applications. The network applications comprise PHY, MAC, RLC, PDCP, RRC, and SDAP or some other networking protocol stack. Transceiver circuitry 111 executes the operating system and typically some network applications to exchange the wireless data signals with UEs 101-103 and to exchange the corresponding user data with networking circuitry 112. Networking circuitry 112 executes the operating system and some or all network applications to exchange the user data between transceiver circuitry 111 and network core 120.

Network core 120 comprises hardware like CPUs, GPUs, RAM, flash memory, bus structures, network transceivers, and/or the like. Software is stored in the memory circuitry and includes operating systems, virtual layers, and network functions. The network functions comprise Access and Mobility Management Function (AMF), User Plane Function (UPF), Session Management Function (SMF), Policy Control Function (PCF), Authentication Server Function (AUSF), Network Slice Selection Function (NSSF), and the like. The CPUs/GPUs execute the operating systems, virtual layers, and network functions to exchange the user data with radio circuitry 110.

UE 101 is Type A as indicated by its subscriber data. UE 101 wirelessly attaches to transceiver circuitry 111. Transceiver circuitry 111 transfers attachment signaling for UE 101 to networking circuitry 112. The attachment signaling may indicate that UE 101 is Type A. Networking circuitry 112 transfers attachment signaling for UE 101 to network core 120. Network core 120 processes the attachment signaling to authenticate and authorize UE 101. During authentication and authorization, network core 120 determines subscriber data indicating that UE 101 is Type A. Network core 120 transfers attachment signaling to networking circuitry 112 that indicates the authorization and the subscriber data for UE 101. For example, an AMF in network core 120 may transfer N2 signaling indicating a roaming subscriber for UE 101 to a Radio Resource Control (RRC) in networking circuitry 112. Networking circuitry 112 transfers the subscriber data to transceiver circuitry 111. For example, an RRC in networking circuitry may indicate the roaming subscriber data for UE 101 to a Media Access Control (MAC) in transceiver circuitry 111. In response to the authorization and the subscriber data for UE 101, transceiver circuitry 111 selects a DRX duty cycle for UE 101 based on its Type A as indicated by the subscriber data. For example, the MAC may select a DRX duty cycle for UE 101 based on its roaming UE subscriber data. The DRX duty cycle controls when UE 101 will power down its radio circuitry and when UE 101 will power up its radio circuitry. Transceiver circuitry 111 wirelessly exchanges wireless data signals with UE 101 using the selected DRX duty cycle. Thus, transceiver circuitry 111 powers its radio components up and down per the DRX duty cycle.

UE 102 is Type B and wirelessly attaches to transceiver circuitry 111. Transceiver circuitry 111 transfers attachment signaling for UE 102 to networking circuitry 112. Networking circuitry 112 transfers attachment signaling for UE 102 to network core 120. Network core 120 processes the attachment signaling to authenticate and authorize UE 102. During authentication and authorization, network core 120 determines subscriber data indicating that UE 102 is Type B. Network core 120 transfers attachment signaling to networking circuitry 112 that indicates the authorization and the subscriber data for UE 102, and networking circuitry 112 transfers attachment signaling to transceiver circuitry 111 that indicates the authorization and the subscriber data for UE 102. For example, an AMF in network core 120 may transfer N2 signaling indicating a virtual network identifier for UE 102 to an RRC in networking circuitry 112. Networking circuitry 112 transfers the subscriber data to transceiver circuitry 111. In response to the authorization and the subscriber data for UE 102, transceiver circuitry 111 selects a DRX duty cycle for UE 102. For example, a MAC may select a DRX duty cycle for UE 102 based on its virtual network identifier. Transceiver circuitry 111 wirelessly exchanges wireless data signals with UE 102 using the selected DRX duty cycle.

UE 103 is Type N and wirelessly attaches to transceiver circuitry 111. Transceiver circuitry 111 transfers attachment signaling for UE 103 to networking circuitry 112. Networking circuitry 112 transfers attachment signaling for UE 103 to network core 120. Network core 120 processes the attachment signaling to authenticate and authorize UE 103. During authentication and authorization, network core 120 determines subscriber data indicating that UE 103 is Type N. Network core 120 transfers attachment signaling to networking circuitry 112 that indicates the authorization and the subscriber data for UE 103, and networking circuitry 112 transfers attachment signaling to transceiver circuitry 111 that indicates the authorization and the subscriber data for UE 103. For example, an AMF in network core 120 may transfer N2 signaling indicating the access class for UE 103 to an RRC in networking circuitry 112. Networking circuitry 112 transfers the subscriber data to transceiver circuitry 111. In response to the authorization and the subscriber data for UE 103, transceiver circuitry 111 selects a DRX duty cycle for UE 103. For example, a MAC may select a DRX duty cycle for UE 103 based on its access class. Transceiver circuitry 111 wirelessly exchanges wireless data signals with UE 103 using the selected DRX duty cycle.

Radio circuitry 110 selects and uses DRX duty cycles for UEs 101-103 based on their individual subscriber data. Advantageously, wireless communication network 100 efficiently and effectively uses the subscriber data to control DRX. Moreover, the DRX duty cycles may be customized for specific types of wireless user devices. For example, the DRX duty cycle for roaming UEs may have longer off periods to conserve more power.

Figure 2:
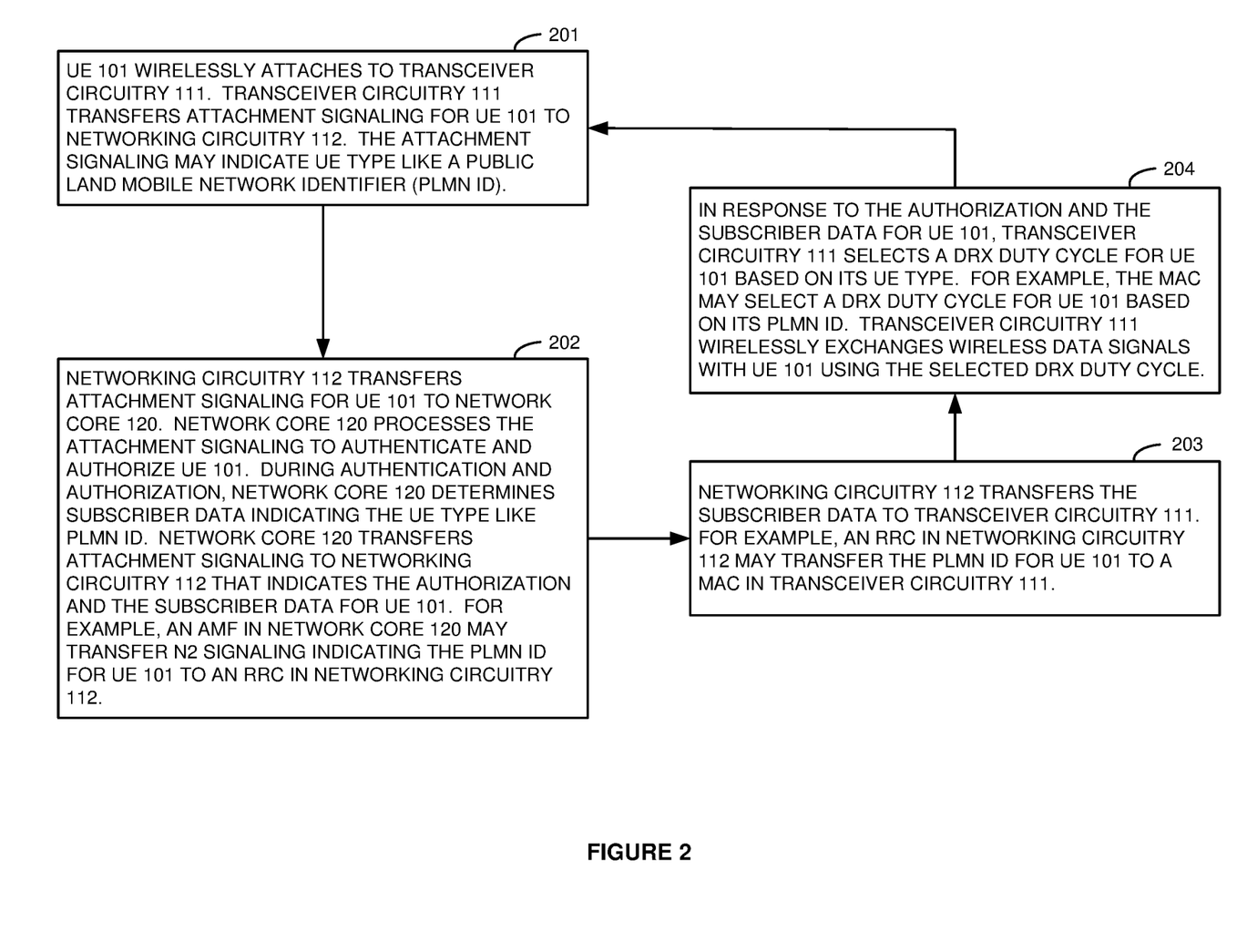
FIG. 2 illustrates the operation of the wireless communication network to control DRX based on UE subscriber data.

FIG. 2 illustrates the operation of wireless communication network 100 to control DRX based on UE subscriber data. UE 101 wirelessly attaches to transceiver circuitry 111 (201). Transceiver circuitry 111 transfers attachment signaling for UE 101 to networking circuitry 112. The attachment signaling may indicate UE Type like a Public Land Mobile Network Identifier (PLMN ID). Networking circuitry 112 transfers attachment signaling for UE 101 to network core 120 (202). Network core 120 processes the attachment signaling to authenticate and authorize UE 101. During authentication and authorization, network core 120 determines subscriber data indicating the UE Type such as PLMN ID. Network core 120 transfers attachment signaling to networking circuitry 112 that indicates the authorization and the subscriber data for UE 101. For example, an AMF in network core 120 may transfer N2 signaling indicating the PLMN ID for UE 101 to an RRC in networking circuitry 112. Networking circuitry 112 transfers the subscriber data to transceiver circuitry 111 (203). For example, an RRC in networking circuitry 112 may transfer the PLMN ID to a MAC in transceiver circuitry 111. In response to the authorization and the subscriber data for UE 101, transceiver circuitry 111 selects a DRX duty cycle for UE 101 (204). For example, the MAC may select a DRX duty cycle for UE 101 based on its PLMN ID. Transceiver circuitry 111 wirelessly exchanges wireless data signals with UE 101 using the selected DRX duty cycle.

Figure 3:
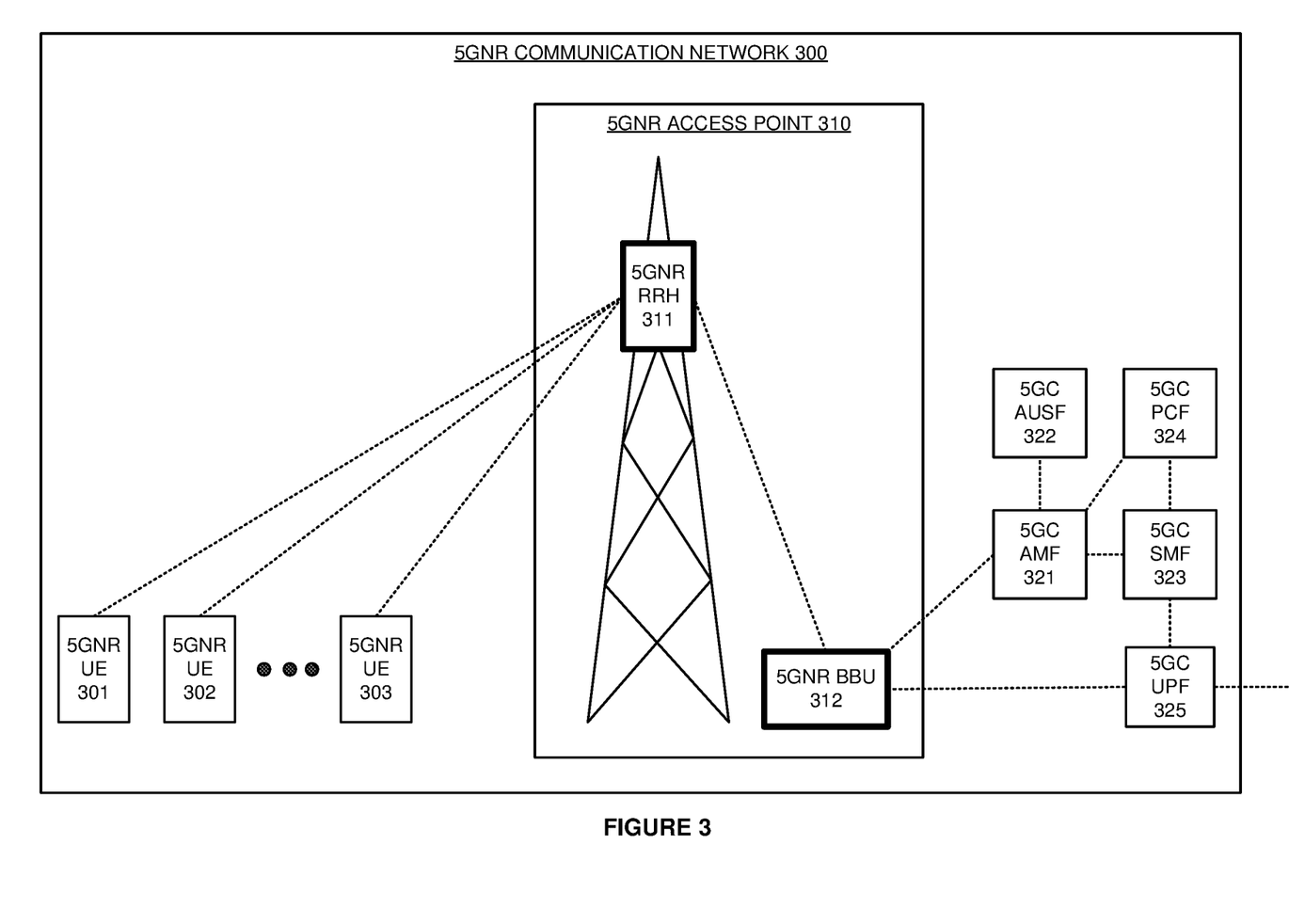
FIG. 3 illustrates a Fifth Generation New Radio (5GNR) communication network that controls DRX based on UE subscriber data.

FIG. 3 illustrates Fifth Generation New Radio (5GNR) communication network 300 that controls DRX based on UE subscriber data. 5GNR communication network 300 is an example of wireless communication network 100, although network 100 may differ. 5GNR communication network 300 comprises 5GNR UEs 301-303, 5GNR access point 310, Fifth Generation Core (5GC) Access and Mobility Management Function (AMF) 321, 5GC Authentication Server Function (AUSF) 322, 5GC Session Management Function (SMF) 323, 5GC Policy Control Function (PCF) 324, and 5GC User Plane Function (UPF) 325. Wireless access point 310 comprises 5GNR Remote Radio Head (RRH) 311 and 5GNR Baseband Unit (BBU) 312. 5GNR UEs 301-303 might be computers, sensors, phones, robots, vehicles, and the like. As in FIG. 1, the number of UEs has been restricted for clarity, and 5GNR communication network 300 includes many more UEs like UEs 301-303.

5GNR UEs 301-303 and 5GNR RRH 311 are coupled by wireless data links. 5GNR RRH 311 and 5GNR BBU 312 are coupled by wireless and/or wireline data links. 5GNR BBU 312 is coupled to 5GC AMF 321 and 5GC UPF 325 by wireless and/or wireline data links. 5GC AMF 321 is coupled to 5GC AUSF 322, 5GC SMF 323, and PCF 324. 5GC UPF 325 is coupled to 5GNR BBU 312 and to SMF 323.

In operation, 5GNR UE 301 wirelessly attaches to 5GNR RRH 311. 5GNR RRH 311 transfers attachment signaling for 5GNR UE 301 to 5GNR BBU 312. 5GNR BBU 312 transfers N2 attachment signaling for 5GNR UE 301 to 5GC AMF 321. 5GC AMF 321 accesses 5GC AUSF 322 to authenticate and authorize 5GNR UE 301. 5GC AUSF 322 also determines subscriber data for 5GNR UE 301 like wireless network slice. 5GC AUSF 322 may access a 5GC Unified Data Management (UDM) to obtain the subscriber data. 5GC AUSF 322 indicates the subscriber data to 5GC AMF 321. 5GC AMF 321 transfers N2 signaling to 5GNR BBU 312 that indicates the authorization and the subscriber data for 5GNR UE 301. BBU 312 transfers the subscriber data to 5GNR RRH 311. In response to the authorization, 5GNR RRH 311 selects a DRX duty cycle for 5GNR UE 301 based on the subscriber data like the wireless network slice. RRH 311 wirelessly exchanges wireless data signals with 5GNR UE 301 using the selected DRX duty cycle. 5GNR UEs 302-303 attach and use DRX as directed by 5GNR access point 310 in a similar manner.

Figure 4:
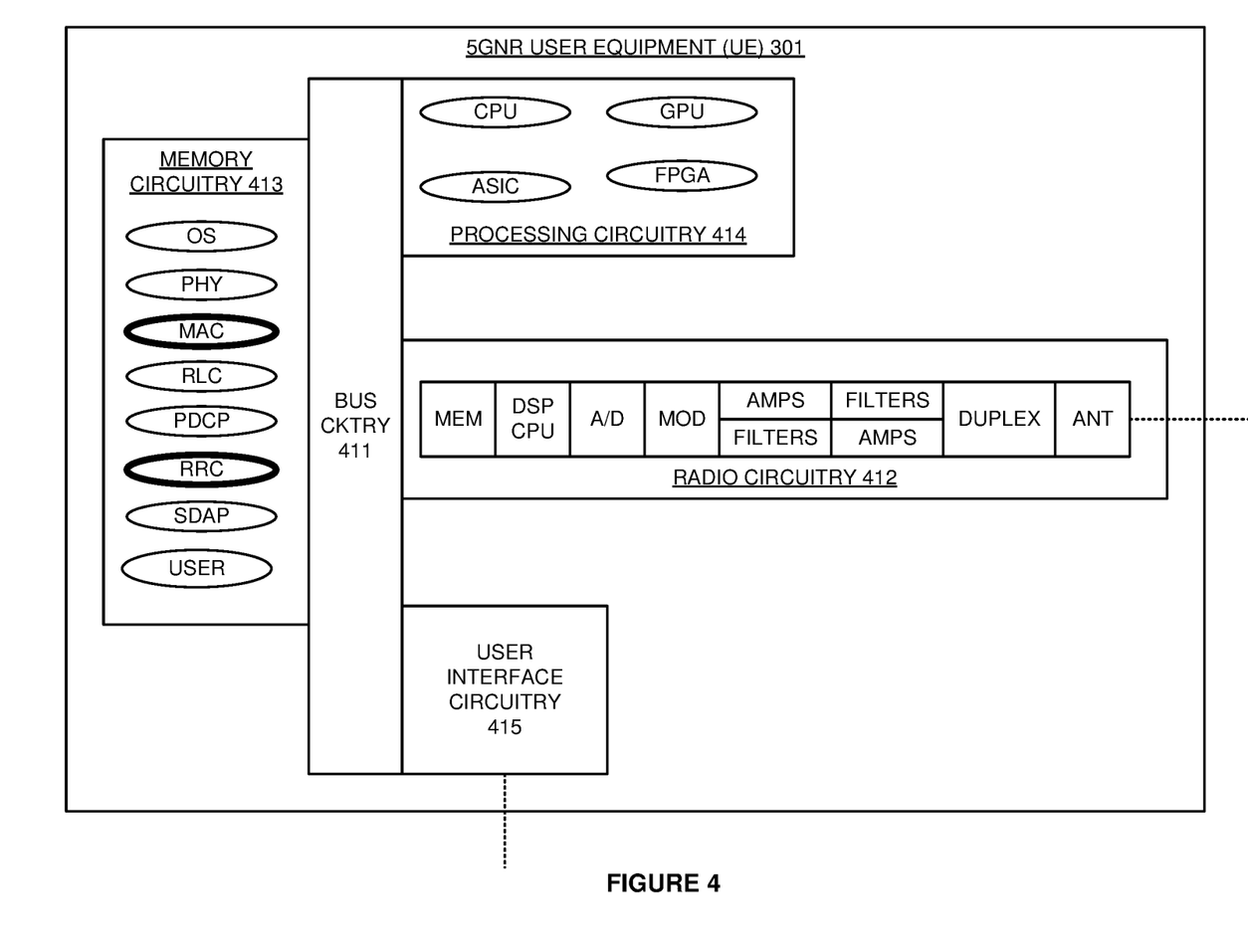
FIG. 4 illustrates a 5GNR UE that uses DRX based on UE subscriber data.

FIG. 4 illustrates 5GNR UE 301 that uses DRX based on UE subscriber data. 5GNR UE 301 is an example of UEs 101-105 and 302-303, although UEs 101-105 and 302-303 may differ. UE 301 comprises bus circuitry 411, radio circuitry 412, memory circuitry 413, processing circuitry 414, and user interface circuitry 415. Bus circuitry 411 couples radio circuitry 412, memory circuitry 413, processing circuitry 414, and user interface circuitry 415. Memory circuitry 413 comprises volatile and non-volatile memories like RAM, flash, disc, tape, and the like. Memory circuitry 413 stores an operating system (OS), network applications, and user applications (User). The network applications comprise Physical Layer (PHY), Media Access Control (MAC), Radio Link Control (RLC), Packet Data Convergence Protocol (PDCP), Radio Resource Control (RRC), and Service Data Application Protocol (SDAP). Processing circuitry 414 comprises CPUs, GPUs, ASICs, FPGAs, and/or some other computer hardware. Processing circuitry 414 executes the operating system and user applications to generate user data and signaling. Processing circuitry 414 executes the operating system and the network applications to drive radio circuitry 412 to wirelessly exchange data and signaling with 5GNR access point 310. User interface circuitry 415 may comprise transceivers, machine controllers, graphic displays, sensors, cameras, and/or some other user components.

Radio circuitry 412 comprises antennas (ANT), duplexers (DUPLEX), filters, amplifiers (AMPS), modulators (MOD), Analog/Digital interfaces (A/D), DSP, CPU, and memory (MEM). The antennas in radio circuitry 412 exchange wireless signals that carry user data and network signaling with 5GNR access point 310. In radio circuitry 412, the DSP/CPUs execute firmware/software to drive the exchange of corresponding data signals between the antennas and memory circuitry 413. In particular, the MAC uses a DRX duty cycle that was selected based on subscriber data like the wireless network slice for UE 301. Radio circuitry 412 exchanges corresponding data and signaling with 5GNR access point 310 using the selected DRX duty cycle.

The user applications generate user data and user signaling. The user applications exchange user data with the SDAP. The user applications exchange user signaling with the RRC. The SDAP maps between user data and Service Data Units (SDUs). The RRC performs attachment and interacts with AMFs over N1 signaling to establish and terminate data sessions. The RRC handles authentication, security, handover operations, status reporting, QoS, system broadcasts, and network pages. The RRC and the SDAP exchange the SDUs with the PDCP. The PDCP maps between the SDUs and Protocol Data Units (PDUs) for the RLC. PDCP functions comprise security ciphering, header compression and decompression, sequence numbering and re-sequencing, de-duplication. The PDCP exchange PDUs with the RLC. The RLC maps between the PDUs and MAC logical channels. RLC functions comprise ARQ, sequence numbering and resequencing, segmentation and resegmentation. The RLC exchanges the SDAP data and RRC signaling from the PDUs with the MAC over MAC logical channels. The MAC maps between the MAC logical channels and MAC transport channels. MAC functions include buffer status, power headroom, channel quality, Hybrid Automatic Repeat Request (HARQ), user identification, random access, user scheduling (including DRX), and QoS. The MAC exchanges the data and signaling with the PHY over the MAC transport channels.

The PHY maps between the MAC transport channels and PHY transport channels. The PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping. The PHY exchanges the user data and network signaling with a PHY in 5GNR access point 310 over the PHY transport channels.

The PHY stores Uplink (UL) data and signaling in the radio circuitry 412 memory. In radio circuitry 412, the DSP/CPUs transfer corresponding UL signals to the analog/digital interface. The analog/digital interface converts the digital UL signals into analog UL signals for the modulators. The modulators up-convert the UL signals to their carrier frequencies. The amplifiers boost the UL signals for the filters which attenuate unwanted out-of-band energy. The filters transfer the UL signals through the duplexers to the antennas. The electrical UL signals drive the antennas to emit corresponding wireless UL signals that carry the UL data and signaling to 5GNR access point 310. The MAC drives the DSP/CPU to power down the A/D interface, modulators, amplifiers, and filters during the "off" periods of the selected DRX duty cycle.

In radio circuitry 412, the antennas receive wireless Downlink (DL) signals that carry data and signaling from 5GNR access point 310 and transfer corresponding electrical DL signals through the duplexers to the amplifiers. In radio circuitry 412, the amplifiers boost the received DL signals for filters which attenuate unwanted energy. In modulation, demodulators down-convert the DL signals from their carrier frequencies. The analog/digital interfaces convert the analog DL signals into digital DL signals for the DSP/CPUs. The MAC drives the DSP/CPU to power down the A/D interface, modulators, amplifiers, and filters during the "off" periods of the selected DRX duty cycle.

The DSP/CPUs recover DL data that includes user data and network signaling from the DL signals. The network signaling indicates the selected DRX duty cycle to the RRC, and the RRC indicates the selected DRX duty to the MAC. The DSP/CPUs transfer the DL data and signaling to memory circuitry 413. The network applications process the DL data and signaling and forward corresponding user data and signaling to the user applications. The user applications process the user data and signaling to drive user interface circuitry 415.

Figure 5:
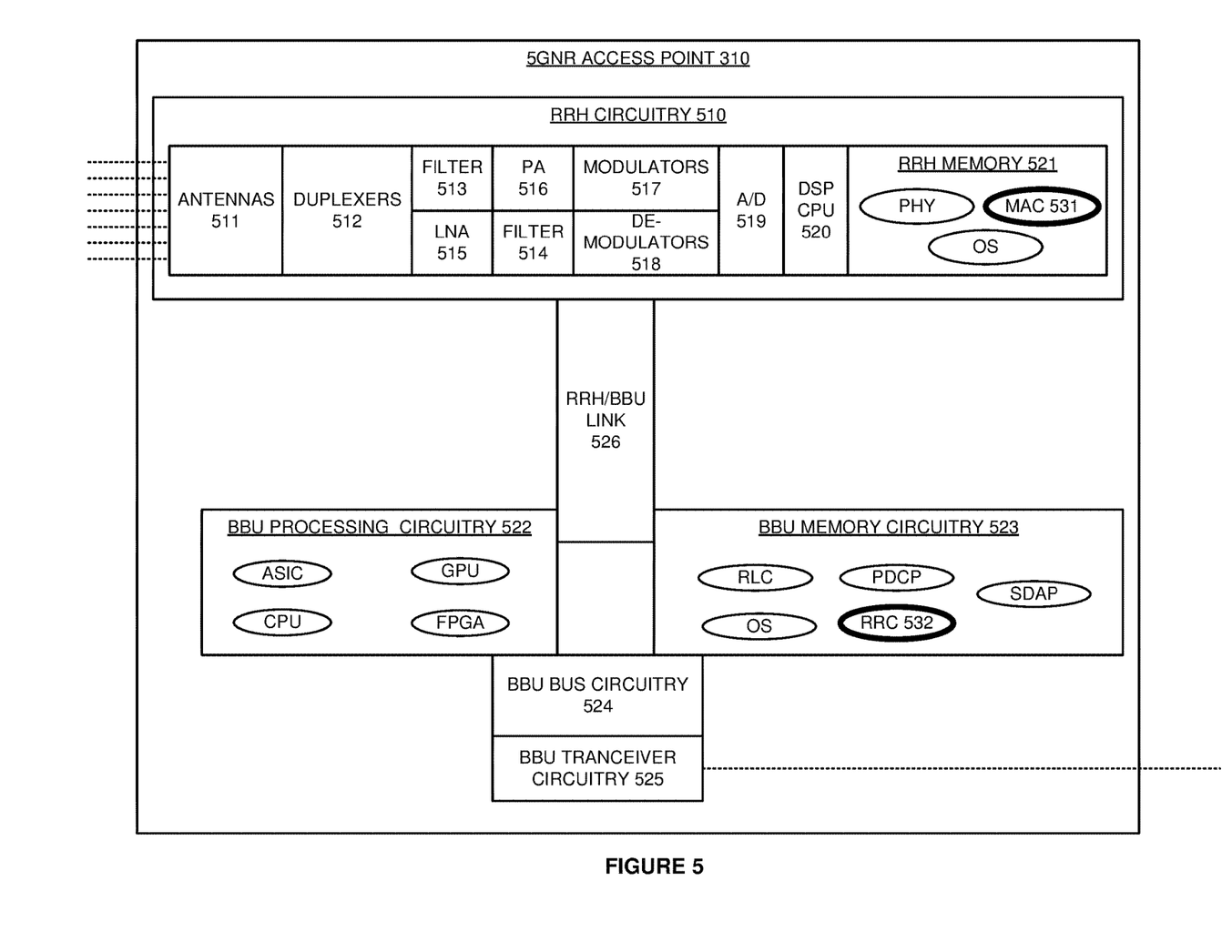
FIG. 5 illustrates a 5GNR access point that controls DRX based on UE subscriber data.

FIG. 5 illustrates 5GNR access point 310 that controls DRX based on UE subscriber data. 5GNR access point 310 is an example of radio circuitry 110, although radio circuitry 110 may differ. 5GNR access point 310 comprises Remote Radio Head (RRH) circuitry 510, RRH/Baseband Unit (BBU) link 526, BBU processing circuitry 522, BBU memory circuitry 523, BBU bus circuitry 524, and BBU transceiver circuitry 525. RRH/BBU link 526 couples RRH circuitry 510 to BBU processing circuitry 522 and BBU memory circuitry 523. BBU bus circuitry 524 couples BBU processing circuitry 522, BBU memory circuitry 523, and BBU transceiver circuitry 525. BBU transceiver circuitry 525 is coupled to 5GC AMF 321 and 5GC UPF 325.

BBU processing circuitry 522 comprises CPUs, GPUs, ASICs, FPGAs, and/or some other computer circuitry. BBU memory circuitry 523 comprises volatile and non-volatile memories like RAM, flash, disc, tape, and the like. BBU memory circuitry 523 stores an operating system and network applications. In this example, the network applications comprise RLC, PDCP, RRC 532, and SDAP—although BBU circuitry 522-523 may host all network applications, no network applications, or another group of network applications. BBU processing circuitry 522 executes the operating system and network applications to exchange data and signaling in PDUs with RRH circuitry 510. BBU processing circuitry 522 executes the operating system and network applications to exchange corresponding N1 signaling and N2 signaling with AMF 321 and to exchange N3 data with UPF 325 over BBU circuitry 524-525.

RRH circuitry 510 comprises antennas 511, duplexers 512, filters 513-514, Low-Noise Amplifier (LNA) 515, Power Amplifier (PA) 516, modulators 517, de-modulators 518, A/D interfaces 519, DSP/CPU 520, and RRH memory 521. RRH memory 521 comprises volatile and non-volatile memories like RAM, flash, and the like. RRH memory 521 stores an operating system and network applications. In this example, the RRH network applications comprise PHY and MAC 531—although RRH circuitry 510 may host all network applications, no network applications, or another group of network applications. In this exemplary split, MAC 531 in RRH circuitry 510 and RRC 532 in BBU circuitry 522 exchange data and signaling over MAC logical channels that traverse RRH/BBU link 521. DSP/CPU 520 executes the operating systems and network applications to exchange the data and signaling between BBU memory circuitry 523 and UEs 301-303 over RRH circuitry 510.

In BBU processing circuitry 522, RRC 532 generates and consumes N2 signaling that it exchanges with AMF 321. RRC 532 identifies subscriber data in the N2 signaling and transfers the subscriber data to MAC 531. For example, RRC 532 may identify wireless network slices for UEs 301-303 from the N2 signaling and transfer the UE/slice pairings to MAC 531. RRC 532 exchanges N1 signaling between UEs 301-303 and AMF 321. RRC 532 also handles data sessions, security, handovers, status reports, QoS, system broadcasts, and network pages. The SDAP exchanges N3 data with UPF 325. The SDAP maps the N3 data into SDUs and marks the data for the proper QoS. RRC 532 and the SDAP exchange their SDUs with the PDCP.

The PDCP maps between the SDUs and PDUs for the RLC. PDCP functions comprise security ciphering, header compression and decompression, sequence numbering and re-sequencing, de-duplication. The PDCP exchange PDUs having the data and signaling with the RLC. The RLC maps between the PDUs and MAC logical channels. RLC functions comprise ARQ, sequence numbering and resequencing, segmentation and resegmentation. The RLC exchanges the data and signaling with MAC 531 over MAC logical channels that traverse RRH/BBU link 521.

In RRH DSP/CPU 520, MAC 531 receives UE subscriber data for UEs 301-303 from RRC 532. MAC 531 selects DRX duty cycles for UEs 301-303 based on their subscriber data such as their wireless network slice. MAC 531 indicates the DRX duty cycles to the MACs in UEs 301-303. MAC 531 maps between the MAC logical channels and MAC transport channels. MAC functions include buffer status, power headroom, channel quality, HARQ, user identification, random access, user scheduling (including DRX), and QoS. MAC 531 exchanges the data and signaling with the PHY over the MAC transport channels.

The PHY maps between the MAC transport channels and PHY transport channels. The PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping. The PHY exchanges the data and signaling with PHYs in UEs 301-303 over the PHY transport channels.

In RRH circuitry 510, antennas 511 receive wireless UL signals from UEs 301-303 and transfer corresponding electrical UL signals through duplexers 512 to LNA 515. LNA 515 boosts the UL signals for filter 514 which attenuates unwanted out-of-band energy. De-modulators 518 down-convert the UL signals from their carrier frequencies. A/D interfaces 519 convert the analog UL signals into digital UL signals for DSP/CPU 520.

DSP/CPU 520 executes the network applications to recover and store UL data and signaling in BBU memory circuitry 523. In BBU processing circuitry 522, the BBU network applications process the recovered UL data and signaling from BBU memory circuitry 523. RRC 532 generates and consumes N2 signaling. RRC 532 and the SDAP forward the UL N1 signaling, N2 signaling, and N3 data from memory circuitry 523 to AMF 321 and UPF 325 over BBU circuitry 524-525.

BBU transceiver circuitry 525 receives Downlink (DL) N1 signaling, N2 signaling, and N3 data from AMF 321 and UPF 325. BBU transceiver circuitry 525 stores the DL data and signaling in BBU memory circuitry 523. The BBU network applications process the N3 data and N2 signaling from memory circuitry 523 to generate data and signaling. The BBU network applications forward the data and signaling to the RRH network applications in RRH circuitry 510 over MAC logical channels in RRH/BBU link 526. Moreover, RRC 532 identifies subscriber data for UEs 301-303 in the N2 signaling and forwards the subscriber data to MAC 531.

In RRH circuitry 510, the network applications drive DSP/CPU 520 to transfer corresponding DL signals to A/D interface 519. A/D interface 519 converts the digital DL signals into analog DL signals for modulators 517. Modulators 517 up-convert the DL signals to their carrier frequencies. PA 516 amplifies the DL signals to a transmit power level. PA 516 transfers the amplified DL signals to filter 513 which attenuates unwanted out-of-band energy. Filter 513 transfers the DL signals through duplexers 512 to antennas 511. The electrical DL signals drive antennas 511 to emit corresponding wireless DL signals to 5GNR UEs 301-303.

Figure 6:
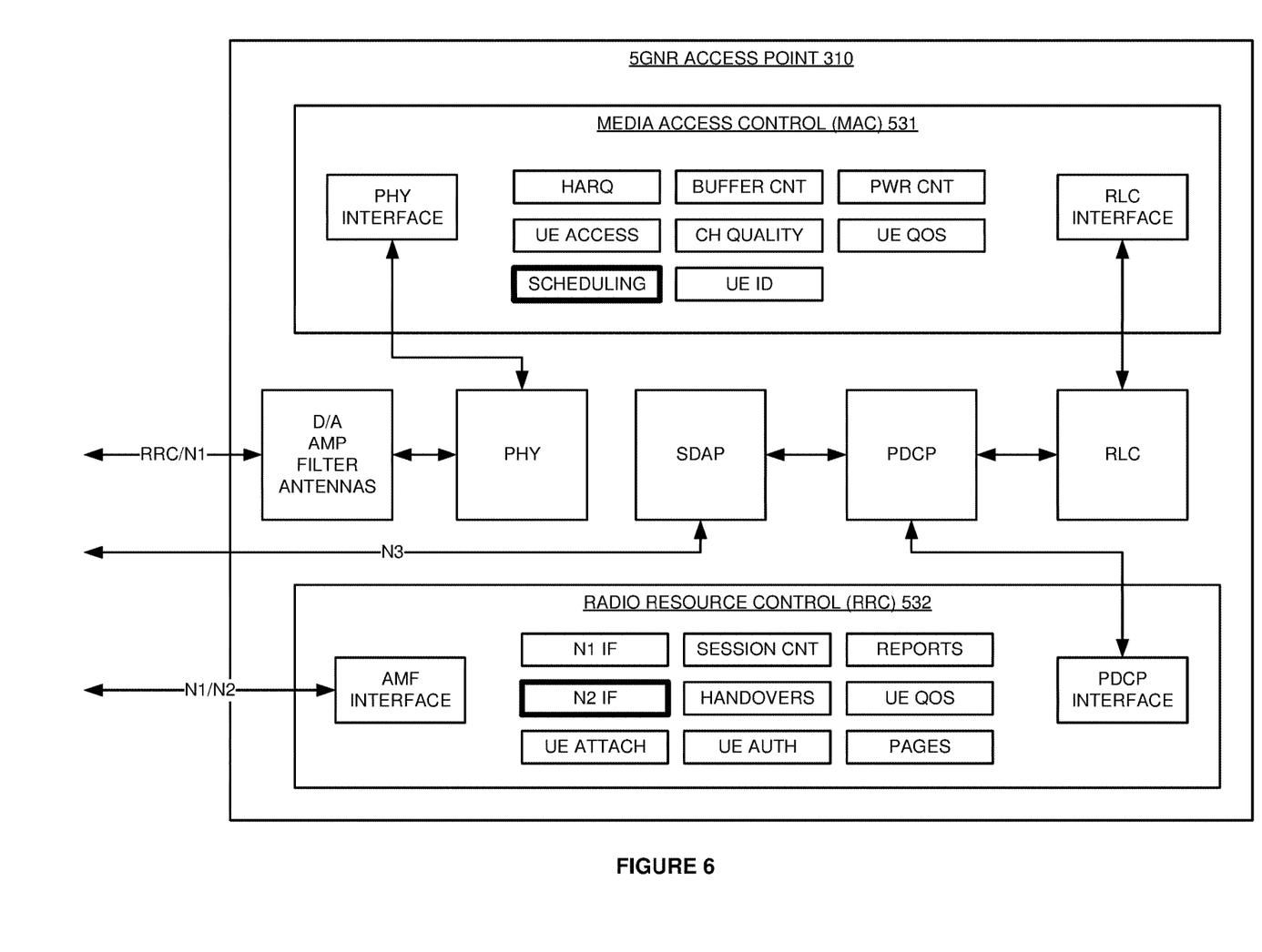
FIG. 6 illustrates a 5GNR Media Access Control (MAC) and 5GNR Radio Resource Control (RRC) that control DRX based on UE subscriber data.

FIG. 6 illustrates 5GNR access point 310 having Media Access Control (MAC) 531 and Radio Resource Control (RRC) 532 to control DRX based on UE subscriber data. An AMF interface in RRC 532 exchanges N1 and N2 signaling with AMF 321. An N1 interface forwards the N1 signaling to UEs 301-303. An N2 interface consumes and generates N2 signaling to handle RRC tasks. The N2 interface identifies UE subscriber data in the N2 signaling like wireless network slice. The N2 interface forwards the UE subscriber data to MAC 531. RRC 532 also has modules for UE attachment, session control (CNT), handovers, UE authentication/authorization (AUTH), status reports, UE QoS, and UE pages.

RRC 532 has a SDAP interface that exchanges N3 data with UPF 325. The SDAP interface exchanges corresponding user data with the PDCP. RRC 532 has a PDCP interface that exchanges network signaling (including N1) with the PDCP. The PDCP exchanges the user data and network signaling with the RLC, and the RLC exchanges the user data and network signaling with the RLC interface in MAC 531.

MAC 531 has modules for HARQ, UE access, UE scheduling, buffer control, channel (CH) quality, UE identification, power control, and UE QoS. The scheduling module receives the subscriber data for UEs 301-303 from RRC 532. The scheduling module selects DRX duty cycles for UEs 301-303 based on their subscriber data. For example, the scheduling module may host a data structure that translates subscriber data like wireless network slices into DRX duty cycles. The scheduling module indicates the selected DRX duty cycles to the MACs in UEs 301-303. MAC 531 has a PHY interface that exchanges user data and network signaling with the PHY. The PHY exchanges RRC signals that carry the user data and network signaling with radio circuitry that comprises D/A, amplifiers, filters, and antennas. The antennas exchange wireless RRC signals that carry the user data and network signaling with UEs 301-303.

The wireless data network circuitry described above comprises computer hardware and software that form special-purpose wireless communication circuitry that controls DRX based on UE subscriber data. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless communication circuitry that controls DRX based on UE subscriber data.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating radio circuitry to serve wireless User Equipment (UEs), the method comprising:
   transceiver circuitry wirelessly exchanging data signals with the UEs;
   Radio Resource Control (RRC) circuitry receiving individual subscriber data for individual ones of the UEs wherein the subscriber data indicates individual Public Land Mobile Networks (PLMNs) for the individual ones of the UEs;
   the RRC circuitry transferring the individual subscriber data to Media Access Control (MAC) circuitry;
   the MAC circuitry selecting individual Discontinuous Reception (DRX) duty cycles for the individual ones of the UEs based their individual PLMNs indicated by the subscriber data; and the transceiver circuitry wirelessly exchanging subsequent data signals with the UEs using the selected individual DRX duty cycles for the individual ones of the UEs.

2. The method of claim 1 wherein the subscriber data indicates individual wireless network slices for the individual ones of the UEs, and the MAC circuitry selecting the individual DRX duty cycles for the individual ones of the UEs comprises selecting the individual DRX duty cycles for the individual ones of the UEs based on their individual wireless network slices and their individual PLMNs indicated by the subscriber data.

3. The method of claim 1 wherein the subscriber data indicates individual virtual network identifiers for the individual ones of the UEs, and the MAC circuitry selecting the individual DRX duty cycles for the individual ones of the UEs comprises selecting the individual DRX duty cycles for the individual ones of the UEs based on their individual virtual network identifiers and their individual PLMNs and their individual PLMNs indicated by the subscriber data.

4. The method of claim 1 wherein the subscriber data indicates individual Quality-of-Service (QoS) identifiers for the individual ones of the UEs, and the MAC circuitry selecting the individual DRX duty cycles for the individual ones of the UEs comprises selecting the individual DRX duty cycles for the individual ones of the UEs based on their individual QoS identifiers and their individual PLMNs indicated by the subscriber data.

5. The method of claim 1 wherein the subscriber data indicates individual wireless network slices and individual Quality-of-Service (QoS) identifiers for the individual ones of the UEs, and the MAC circuitry selecting the individual DRX duty cycles for the individual ones of the UEs comprises selecting the individual DRX duty cycles for the individual ones of the UEs based on their individual wireless network slices, their individual QoS identifiers, and their individual PLMNs indicated by the subscriber data.

6. The method of claim 1 wherein the subscriber data indicates individual access classes for the individual ones of the UEs, and the MAC circuitry selecting the individual DRX duty cycles for the individual ones of the UEs comprises selecting the individual DRX duty cycles for the individual ones of the UEs based on their individual access classes and their individual PLMNs indicated by the subscriber data.

7. The method of claim 1 wherein the subscriber data indicates individual wireless network slices and individual access classes for the individual ones of the UEs, and the MAC circuitry selecting the individual DRX duty cycles for the individual ones of the UEs comprises selecting the individual DRX duty cycles for the individual ones of the UEs based on their individual wireless network slices, their individual access classes, and their individual PLMNs indicated by the subscriber data.

8. The method of claim 1 wherein the subscriber data indicates when the individual ones of the UEs are roaming, and the MAC circuitry selecting the individual DRX duty cycles for the individual ones of the UEs comprises selecting the individual DRX duty cycles for the individual ones of the UEs based on their individual PLMNs indicated by the subscriber data and based on when the individual ones of the UEs are roaming indicated by the subscriber data.

9. The method of claim 1 wherein the subscriber data indicates individual wireless network slices for the individual ones of the UEs and when the individual ones of the UEs are roaming, and the MAC circuitry selecting the individual DRX duty cycles for the individual ones of the UEs comprises selecting the individual DRX duty cycles for the individual ones of the UEs based on their individual wireless network slices and their individual PLMNs indicated by the subscriber data and based on when the individual ones of the UEs are roaming indicated by the subscriber data.

10. Radio circuitry to serve wireless User Equipment (UEs), the radio circuitry comprising:
transceiver circuitry configured to wirelessly exchange data signals with the UEs;
Radio Resource Control (RRC) circuitry configured to receive individual subscriber data for individual ones of the UEs wherein the subscriber data indicates individual Public Land Mobile Networks (PLMNs) for the individual ones of the UEs;
the RRC circuitry configured to transfer the individual subscriber data to Media Access Control (MAC) circuitry;
the MAC circuitry configured to select individual Discontinuous Reception (DRX) duty cycles for the individual ones of the UEs based their individual PLMNs indicated by the subscriber data; and
the transceiver circuitry configured to wirelessly exchange subsequent data signals with the UEs using the selected individual DRX duty cycles for the individual ones of the UEs.

11. The radio circuitry of claim 10 wherein the subscriber data indicates individual wireless network slices for the individual ones of the UEs, and the MAC circuitry is configured to select the individual DRX duty cycles for the individual ones of the UEs based on their individual wireless network slices and their individual PLMNs indicated by the subscriber data.

12. The radio circuitry of claim 10 wherein the subscriber data indicates individual virtual network identifiers for the individual ones of the UEs, and the MAC circuitry is configured to select the individual DRX duty cycles for the individual ones of the UEs based on their individual virtual network identifiers and their individual PLMNs indicated by the subscriber data.

13. The radio circuitry of claim 10 wherein the subscriber data indicates individual Quality-of-Service (QoS) identifiers for the individual ones of the UEs, and the MAC circuitry is configured to select the individual DRX duty cycles for the individual ones of the UEs based on their individual QoS identifiers and their individual PLMNs indicated by the subscriber data.

14. The radio circuitry of claim 10 wherein the subscriber data indicates individual wireless network slices and individual Quality-of-Service (QoS) identifiers for the individual ones of the UEs, and the MAC circuitry is configured to select the individual DRX duty cycles for the individual ones of the UEs based on their individual wireless network slices, their individual QoS identifiers, and their individual PLMNs indicated by the subscriber data.

15. The radio circuitry of claim 10 wherein the subscriber data indicates individual access classes for the individual ones of the UEs, and the MAC circuitry is configured to select the individual DRX duty cycles for the individual ones of the UEs based on their individual access classes and their individual PLMNs indicated by the subscriber data.

16. The radio circuitry of claim 10 wherein the subscriber data indicates individual wireless network slices and individual access classes for the individual ones of the UEs, and the MAC circuitry is configured to select the individual DRX duty cycles for the individual ones of the UEs based on their individual wireless network slices, their individual access classes, and their individual PLMNs indicated by the subscriber data.

17. The radio circuitry of claim 10 wherein the subscriber data indicates when the individual ones of the UEs are roaming, and the MAC circuitry is configured to select the individual DRX duty cycles for the individual ones of the UEs based on their individual PLMNs indicated by the subscriber data and based on when the individual ones of the UEs are indicated by the subscriber data.

18. The radio circuitry of claim 10 wherein the subscriber data indicates individual wireless network slices for the individual ones of the UEs and when the individual ones of the UEs are roaming, and the MAC circuitry is configured to select the individual DRX duty cycles for the individual ones of the UEs based on their individual wireless network slices and their individual PLMNs indicated by the subscriber data and based on when the individual ones of the UEs are roaming.

* * * * *